United States Patent [19]

Hefner, Jr. et al.

[11] Patent Number: 4,524,178

[45] Date of Patent: Jun. 18, 1985

[54] COMPOSITIONS OF UNSATURATED POLYESTERS OR POLYESTERAMIDES AND EFFICIENT FLEXIBILIZERS THEREFOR

[75] Inventors: Robert E. Hefner, Jr., Lake Jackson, Tex.; Patrick H. Martin, Danville, Calif.; Gregory A. Stevens, Lake Jackson, Tex.

[73] Assignee: The Dow Chemical Company, Midland, Mich.

[21] Appl. No.: 502,870

[22] Filed: Jun. 9, 1983

[51] Int. Cl.³ .................... C08L 67/06; C08L 77/12; C08L 75/04

[52] U.S. Cl. .................................... 525/28; 523/508; 525/10; 525/46

[58] Field of Search .................... 523/508; 525/10, 28, 525/46

[56] References Cited

U.S. PATENT DOCUMENTS

| | | | |
|---|---|---|---|
| 3,297,745 | 1/1967 | Fekete et al. | 525/455 |
| 3,448,172 | 6/1969 | Damusis et al. | 525/455 |
| 3,598,866 | 8/1971 | Nowak et al. | 560/162 |
| 3,933,728 | 1/1976 | Henbest | 525/28 |
| 4,119,681 | 10/1978 | Veselovsky et al. | 525/28 |
| 4,360,653 | 11/1982 | Stevens et al. | 525/455 |
| 4,390,662 | 6/1983 | Ando et al. | 525/28 |
| 4,413,072 | 11/1983 | Hess et al. | 525/28 |

FOREIGN PATENT DOCUMENTS

| | | | |
|---|---|---|---|
| EP0009761 | 4/1980 | European Pat. Off. | 525/28 |
| 2626819 | 12/1977 | Fed. Rep. of Germany | 523/208 |
| 47-19696 | 6/1972 | Japan | 525/28 |
| 54-130694 | 10/1979 | Japan | 525/28 |
| 55-155011 | 12/1980 | Japan | 525/28 |
| WO81/01292 | 5/1981 | PCT Int'l Appl. | 525/28 |

*Primary Examiner*—Ronald W. Griffin
*Attorney, Agent, or Firm*—Robert R. Stringham

[57] ABSTRACT

Polyester and polyesteramide alkyds containing no polycycloalkenyl end groups, in admixture with non-resinous vinyl monomers, are flexibilized by inclusion in the mixtures of about 1 to 20 parts by weight of a polyglycol moiety-comprising, vinyl reactive, urethane oligomer per hundred parts of the alkyd.

36 Claims, No Drawings

COMPOSITIONS OF UNSATURATED POLYESTERS OR POLYESTERAMIDES AND EFFICIENT FLEXIBILIZERS THEREFOR

BACKGROUND OF THE INVENTION

Related Applications

A patent application, Ser. No. 502,869, co-filed in the name of R. E. Hefner, Jr. as the inventor, with the present application, is directed to the flexibilization of unsaturated polyesters and/or polyesteramides terminated with polycycloalkenyl end groups—such as are deriveable from dicyclopentadiene concentrates, for example.

Another application, Ser. No. 502,886, also co-filed herewith, in the names of P. H. Martin and A. W. Baker as the inventors, is directed to the flexibilization of vinyl ester resins, i.e., of resins comprising vinyl esters deriveable by adduction of monomeric, vinyl-reactive carboxylic acids with the oxirane groups in various types of epoxy resins.

Unsaturated polyester resins are well-known compositions of many uses. The voluminous literature on polyesters is summarized in Vol. 18 of the Encyclopedia of Chemical Technology (Kirk-Othmer; 3d ed.) at pages 575–594. More recently developed but also well known and highly useful are the unsaturated polyesteramide resins. (The "resins" referred to are actually mixtures of the polyester or polyesteramide alkyds with non-resinous vinyl monomers such as styrene.)

It is well recognized that the latter resins could stand improvement in several respects. They typically undergo extensive shrinkage upon curing and the cured resins possess relatively low impact strengths and percent elongations. U.S. Pat. No. 3,448,172—believed to constitute the nearest known prior art to the present invention—discloses substantial improvement in flexural strength and shrinkage of unsaturated polyester resins by adding relatively large amounts of certain "high molecular weight urethane polymers having an ordered arrangement of pendant unsaturation". However, said urethane polymers are relatively complicated to make and—judging from the examples in the patent—the amount of the urethane polymer used must be about equal to the amount of the alkyd component in order to affect the claimed improvement.

OBJECTS OF THE INVENTION

The primary object of the present invention is to provide a less complicated and more efficient flexibilizer for unsaturated polyester and polyesteramide resins.

A further object is to provide, as such flexibilizers, vinyl-terminated urethane oligomers (as subsequently defined herein) which are highly effective in flexibilizer/alkyd weight ratios as low as about 7/100.

Another object is to provide binary mixtures of the aforesaid flexibilizers with polyester or polyesteramide alkyds from which the improved resins of the invention can be prepared by addition of a non-resinous vinyl monomer (reactive diluent).

A particular object is to provide flexibilized polyester and polyesteramide resin compositions which, when cured, exhibit higher impact strengths, ductilities and percent elongations than do the unflexibilized resins per se.

Still other objects will be made apparent to those knowledgeable in the art by the following specifications and claims.

SUMMARY OF THE INVENTION

The foregoing objects are achieved by utilizing, as the flexibilizer component, relatively low molecular weight, branched or linear polymeric molecules made up of "polyglycol" and "urethane" units and terminated at at least one end by a group which is vinyl-reactive (i.e., contains a polymerizable carbon-to-carbon double bond).

The invention may be defined as a flexibilized alkyd composition comprising in admixture:

a. as said alkyd, an unsaturated polyester and/or polyesteramide which includes no terminal polycycloalkenyl groups, and b. from about 1 to about 20 parts by weight of a polyglycol moiety-comprising, urethane oligomer per hundred parts of said alkyd (~1–20 pha of the oligomer), said oligomer having at least two end groups, at least one of which is vinyl-reactive.

(As used herein, the term "polyester" is not intended to encompass the so-called "vinyl ester resins" (adducts of vinyl reactive carboxylic acids with epoxides).)

Unexpectedly, the flexibilizing effect of the above-recited oligomers on isophthalate alkyds has been found to be substantially greater than on orthophthalate alkyds.

In a process aspect, the invention may be defined as the method of making the subject compositions which comprises mixing the oligomer with the alkyd, either or both of which may be in the form of a preformed mixture with a non-resinous vinyl monomer.

DETAILED DESCRIPTION

Suitable polyesters and polyesteramides

The unsaturated polyesters suitable for the practice of the invention are those deriveable, at least in part, from unsaturated polycarboxylic acids (maleic acid, for example) and polyhydroxy compounds (propylene glycol, for example). The unsaturated polyesteramides are those similarly deriveable from the same unsaturated acids, the same polyols and, in addition, polyfunctional amines.

The preferred polyesters may be defined as having a central ester chain consisting essentially of (a) dioxy groups of the formula:

$$-O-R^4-O-$$

wherein $R^4$ is a divalent organic radical selected from the group consisting of alkylene, oxy-linked alkylene, oxy-linked arylene, cycloalkylene, polycycloalkylene, bis(alkyl)cycloalkylene, bis(alkyl)polycycloalkylene, and arylene, and mono-to-trihydroxy alkylene; and (b) diacyl residues of difunctional carboxylic acids, at least a part of said acids being $\alpha,\beta$-unsaturated acids and any remainder being saturated aliphatic acids, aromatic acids or mixtures thereof.

Similarly, the preferred polyesteramides may be defined as those having a central esteramide chain consisting essentially of (a) diamino groups of the formula:

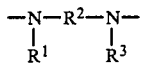

wherein $R^1$ and $R^3$ are independently selected from the group consisting of hydrogen, aliphatic, cycloaliphatic and aromatic or $R^1$ and $R^3$ together form an aliphatic ring, and $R^2$ is a divalent organic radical selected from the group consisting of alkylene, oxy-linked alkylene, oxy-linked arylene, alkylene amino-linked alkylene, alkylene amino-linked cycloalkylene, cycloalkylene, polycycloalkylene, arylene, alkylarylene bis(alkyl)cycloalkylene and bis(alkyl)polycycloalkylene, (b) dioxy groups of the formula:

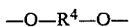

wherein $R^4$ is a divalent organic radical selected from the group consisting of alkylene, oxy-linked alkylene, oxy-linked arylene, cycloalkylene, polycycloalkylene, bis(alkyl)cycloalkylene, bis(alkyl)polycycloalkylene, and arylene, and mono- to trihydroxy alkylene; and (c) diacyl residues of difunctional carboxylic acids, at least a part of said acids being $\alpha,\beta$-unsaturated acids and any remainder being saturated aliphatic acids, aromatic acids or mixtures thereof.

Typical diamine components of the foregoing polyesteramides are ethylene diamine, propylene diamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis(aminomethyl)dicyclopentadiene and homopiperazine. Typical polyamines are aminoethylpiperazine and diethylenetriamine.

The polyol component of the polyester or polyesteramide is from the class having the formula:

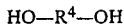

wherein $R^4$ is as above defined. Mixtures of two or more such polyols can be used.

Representative such polyols are ethylene glycol, propylene glycol, diethylene glycol, dipropylene glycol, dicyclopentadiene dimethanol, bis(hydroxymethyl)norbornane, methyl cyclohexanedimethanol, bis(-hydroxypropyl)bisphenol A and other hydroxyalkylated bisphenols, pentaerythritol, sorbitol, glycerine and polypropoxylates of glycerine.

When a polyesteramide is to be used, the ratio of diamine to polyol therein can be varied within wide limits. The latter ratio is significantly related to the solubility of the modified polyesteramide in reactive diluents, such as styrene, which are commonly employed with polyesteramides for many applications. As a general rule, the moles of diamine should not exceed about ½ the combined moles of the polyol and diamine. The structure and size of the diamine molecule will determine to great extent the maximum amount of diamine that can be used.

The unsaturated polycarboxylic acid component of the polyester or polyesteramide preferably is largely composed of an $\alpha,\beta$-unsaturated acid, such as maleic acid, fumaric acid, maleic anhydride or mixtures of those compounds. The latter acids are readily available, have good reactivity with the polyol and/or polyamine, and result in products of good properties.

Part of the $\alpha,\beta$-unsaturated acid may be further replaced with a saturated or aromatic polycarboxylic acid to vary the cross-linking potential and physical properties of the modified polyester or polyesteramide. Such acids include the aliphatic acids such as adipic acid and the aromatic acids such as isophthalic acid. Replacement of part of the $\alpha,\beta$-unsaturated acid with such acids is commonplace in the polyester art. Suitable selection of the acid and the amount thereof to achieve a desired purpose will be known to the skilled worker and can be optimized with simple preliminary experiments.

Although not preferred, endomethylenetetrahydrophthalic acid or anhydride also may be used. The corresponding methyl endomethylenetetrahydrophthalic anhydride or acid may be used instead of or in admixture with the unsubstituted anhydride or acid.

Methods of preparing the foregoing alkyds are well known and will only be summarized herein, as follows.

The total amount of acid varies as a function of the total polyol and polyamine ingredients used. Generally, one equivalent of dicarboxylic acid requires 1.00 to 1.10 equivalents of diol or diol/diamine mixture.

The unsaturated polyesters or polyesteramides are prepared by fusion reaction of the $\alpha,\beta$-unsaturated polycarboxylic acid and the polyol (polyamine) components with the removal of water. Other alternate methods will be recognized by the skilled worker. For example, unsaturated polyesters or polyesteramides are prepared by reaction of the $\alpha,\beta$-unsaturated polycarboxylic acid and monoepoxides as total or partial glycol substitutes. Finally, although less preferred, diesters of $\alpha,\beta$-unsaturated dicarboxylic acids and polyols may be reacted in a transesterification reaction to provide unsaturated polyesters.

Suitable urethane oligomers

The flexibilizer component of the compositions of the invention is a polyglycol moiety-comprising urethane oligomer having at least two end groups, at least one of which is vinyl reactive. The oligomer may be branched or linear but does not include substantial proportions of species having pendant, as well as terminal, vinyl groups. Preferably, it has only one to a few branches and includes no species with pendant vinyl groups.

(As used herein, the term "pendant" refers to a vinyl group attached to an oligomeric chain through a relatively short linking group which itself is non-oligomeric, i.e., is not made up of repeating units. In contrast, "terminal" vinyl groups are found only at the ends of oligomeric chains—which terminate at their opposite ends either in links to other oligomeric chains or in vinyl groups.)

The oligomers of this type disclosed (as "monomers") in U.S. Pat. Nos. 3,297,745 and 4,360,653 are generally suitable for the practice of the present invention. Similar oligomers in which the end groups are incoporated as hydroxyalkyl acrylate-initiated polyglycols, rather than as the hydroxyalkyl acrylates per se, are not only suitable but advantageous in the flexibilizer role.

Also suitable oligomers are the bis(N-vinylcarbamates) formed by the reaction of an unsaturated isocyanate with a polyglycol. Suitable such isocyanates are vinyl isocyanate and isopropenyl isocyanate—as disclosed in U.S. Pat. No. 3,598,866; see Example 8 therein. Similarly, polyadducts of isocyanatoethyl methacrylate, allyl isocyanate, allyl isothiocyanate or allyl glycidyl ether with polyglycols also may be used as the flexibilizing component.

The flexibilizing component of the compositions of the invention alternatively may be of the novel type described in co-pending U.S. patent application Ser. No. 461,342, filed Jan. 27, 1983. This type of flexibilizer is prepared by the reaction of a vinyl- or acryloxy-substituted phenol or phenol-initiated polyol with at least one of the terminal isocyanate (or isothiocyanate) groups in a urethane oligomer formed by reaction of an excess of a difunctional isocyanate (or thiocyanate) with a polyol. The preferred vinyl-substituted phenol for this purpose is phenol itself, substituted by an isopropenyl group. However, such other phenols as cresols ring-substituted with ethenyl, allyl or isopropenyl groups are also suitable and the polyol portion in any or all of the molecules may be terminated by an —NH$_2$ group.

The most generally suitable and economic flexibilizers presently known of are oligomeric reaction products of (1) a diisocyanate, (2) a hydroxy- or aminoalkylacrylate and (3) a polyglycol or amino-capped polyglycol. In these oligomers, the alkyl portion of the hydroxy- or aminoalkylacrylate may be interrupted by one or more oxygen or sulfur atoms; i.e., the hydroxy-substituted acrylate may be a monoacrylate of diethylene- or tripropylene glycol, for example. Also, N-methylol acrylamide may be employed in place of a hydroxyalkylacrylate as a source of vinyl end groups in such oligomers.

Similarly, the vinyl reactive end group(s) of the oligomer may derive from an alkenylamine which is N-substituted by a hydroxy-terminated group; for example, the adduct of from one to several molecules of an alkylene oxide with vinyl-, diallyl- or divinylamine may be reacted with the terminal isocyanate groups in an intermediate polyol/diisocyanate reaction product.

In each of the several foregoing types of unsaturated adducts, the polyglycol moiety preferably is derived from a diol (by base catalyzed reaction with an alkylene oxide) but desirably is based on (initiated with) a triol—such as glycerine or triethanolamine, for example—, or on an aminoalcohol or a polyfunctional amine. Since isocyanates will react with

as well as with —OH (or —SH) groups, the polyglycol unit(s) may be amino-capped and/or the —OH function in an end group precursor—such as 2-hydroxypropyl methacrylate, for example—may be replaced by an —NH$_2$ function.

Preferably, the oligomer has at least two vinyl-reactive end-groups. However, this is not indispensable; species having only one vinyl-reactive end group are considered suitable for the practice of the present invention. On the other hand, a total of three terminal vinyl groups (resulting from use of a triol-based polyglycol) is considered advantageous.

All ramifications of the flexibilizer component are of course within the constraint that the oligomer(s) exhibit the requisite degree of compatibility with the other components (the alkyd or alkyd and vinyl monomer components) of the cured composition of the invention. This can readily be checked for any candidate oligomer, without undue experimentation, in a manner which will be apparent to those knowledgeable in the art.

Methods of Preparation of Flexibilizers

The vinyl terminated urethane oligomers disclosed in U.S. Pat. Nos. 3,297,745 and 4,360,653 are generally suitable for use as flexibilizers in the present invention and may be prepared by the several methods disclosed in said patents.

The latter methods are also generally applicable to the preparation of oligomers in which the terminal unsaturation is derived from a hydroxyacrylate-initiated polyol or a phenol-initiated polyol in which the phenol is ring-substituted with an alkenyl group.

Preparation of oligomers by the reaction of an unsaturated isocyanate, such as isopropenyl isocyanate, allyl isothiocyanate and isocyanatoethyl methacrylate, for example, with a polyglycol is exemplified herein and does not require any procedures unfamiliar to polyurethane chemists.

In preparing oligomers by the condensation of a hydroxy or aminoalkylacrylate, a diisocyanate and a polyglycol, whether the isocyanate is first reacted with the acrylate or the polyglycol is not critical. In either case, however, the reactant ratio in the initial condensation must be controlled to insure the presence of the requisite, unconverted isocyanate end-groups in the intermediate product.

The reaction sequence does effect and can be utilized to manipulate the viscosity (average molecular weight) of the flexibilizer. If the isocyanate is first reacted with the hydroxyacrylate, the vicosity of the final product will be lower than when the isocyanate is first reacted with the polyol.

Flexibilizer Content

The weight percent of the oligomer in the alkyd/vinyl monomer mixtures of the invention can range from about 1 to about 10%.

Preferably, however, the content of flexibilizer in the composition is from about 4 to about 8%; the range of from about 5 to about 7.5% being particularly preferred. In any case, the content of flexibilizer preferably is such that "phasing", i.e., formation of a visibly distinct, second phase, does not result when the composition is cured.

Copolymerizable Vinyl Monomer

The compositions of the invention preferably comprise a non-resinous, vinyl reactive monomer—which preferably is styrene. Other specific such monomers, for example, are vinyl toluene, t-butylstyrene, divinyl benzene and chlorostyrene. Various acrylates, as exemplified by dicyclopentadienyl acrylate, sec-butyl acrylate and ethylacrylate, though less preferred, are considered suitable for the practice of the present invention. Thus, suitable vinylic monomers generally are those commonly copolymerized with polymers having terminal or pendant, vinyl-reactive, olefinic or cycloolefinic double bonds. Such monomers are well catalogued in the prior art.

The well-known catalysts and procedures for the latter type of copolymerization are also generally applicable to "curing" (chain extension and cross-linking) of the compositions of the present invention which comprise vinyl monomers. Those compositions which do not include vinylic monomers are considered novel per se and may be cured by use of the same catalysts and procedures to thermoset products.

The vinyl monomer, frequently called a reactive diluent, may be employed within a wide range of concentration of from about 20 to 80 percent of diliuent to 80 to 20 percent of the polyester or polyesteramide (from about 25 to about 400 pha (parts per hundred parts of alkyd)). The optimum amount will depend in large measure on the particular alkyd, the diluent and the properties desired in the uncured and the cured states but will often be about 50 to about 80 pha. Reactive diluents are employed principally to adjust the viscosity of a resin blend to permit its facile use in a given fabrication procedure. A coating formulation will usually require a lower viscosity than a molding formulation. When the diluent is styrene, the preferred content thereof is from about 60 to about 70 pha.

The weight ratio of the flexibilizer component to the alkyd component in the alkyd/vinyl monomer mixtures of the invention can range from about 1/80 to about 1/5, i.e., from about 1 to about 20 pha. Preferably, the ratio is within the range of from about 1/50 to about 8/50, or from about 2 to about 16 pha.

Other additives that are conventional in the polyester and polyesteramide art may also be included in formulations based upon the flexibilized alkyds. Thus, fillers, pigments and other colorants, reinforcing fibers, and other additives may be added to serve their intended function.

The flexibilized polyesters and polyesteramides are curable by known catalyst systems. Peroxides, such as methylethylketone peroxides, can be used with or without known promoters, such as cobalt octoate or cobalt naphthenate, that function with such peroxides. Acyl peroxides, such as benzoyl peroxides can be used with or without promoters such as tertiary amines, including typically dimethyl aniline and N,N-dimethyl-p-toluidine. The concentrations of catalyst and promoter are adjusted within known limits of from about 0.1 to 3.0 weight percent depending on the rate of cured desired, the magnitude of the generated exotherm and for other known purposes. Known gelation retarding agents, such as p-benzoquinone, can be employed in the curing system.

The flexibilized resin compositions of the present invention are especially suited for use in applications requiring improved flexibility in conjunction with enhanced impact resistance as well as reduced shrinkage upon curing ("low profile"). Typical of these applications are bulk and sheet molding compounds and the parts prepared from said compounds.

The uncured alkyd/flexibilizer compositions of the invention which do not include vinyl monomers (such as styrene, for example) have utility as intermediate materials which can be mixed with such monomers and cured.

EXAMPLES

The following examples are for purposes of illustration and are not be construed as limiting the present invention in a manner inconsistent with the claims appended to these specifications.

Those material names capitalized in the examples are registered trade names.

Where convenient, flexibilizers hereinafter are designated as "VRP"s (vinyl reactive plasticizers).

I. Preparation of Flexibilizers (Not examples of the invention.)

A(1). Preparation of a VRP from a polypropylene glycol, toluene diisocyanate and hydroxypropylacrylate.

A VRP having the statistical structure (A-1)

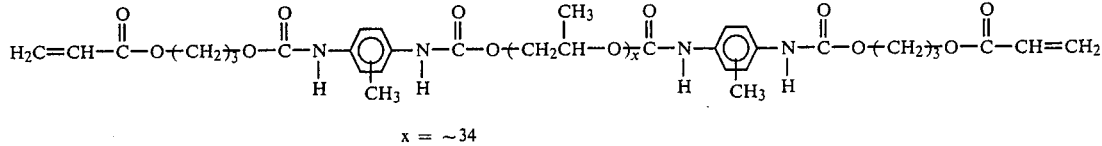

x = ~34 was prepared in two steps; the polyglycol was reacted with the diisocyanate, in the presence of stannous octoate, until the —OH band in the infrared (IR) spectrum of the reaction mixture disappeared and the hydroxyacrylate was then added to react out the remaining isocyanate groups. The detailed procedure follows.

A 0.12% solution of stannous octoate (3.355 grams) in 2811.12 grams (1.4056 g moles) of polypropylene glycol (DOW: P-2000) was added over a period of about 1¾ hours to 488.4 grams (2.8111 g moles) of toluene diisocyanate (Type I, NACONATE 80; registered trade name of The Dow Chemical Company) 80/20 mixture of 2,4- and 2,6-isomers) in a 5-liter resin flask fitted with a reflux condenser and stirrer. The flask contents were heated from an initial temperature of 60° C. to a final temperature of 70° C., during the addition. Stirring was continued at the latter temperature for another ¾ hour, at which time the —OH infrared peak had disappeared. A preformed solution of 1.815 grams of phenothiazine (vinyl polymerization inhibitor) in 330 grams (2.54 g moles) of 2-hydroxypropyl acrylate was then added and the resulting mixture stirred at a temperature of 82°-86° C. for an additional ¾ hour, at which point no further decrease in isocyanate absorption (IR) or increase in carbonyl absorption was observable. The product, designated herein as VRP-A, had a Gardener viscosity, at 20° C., equivalent to 79,200 cps.

A(2). Preparation of a VRP having an ideal structure incorporating two polyglycol units and three diisocyanate units.

A mixture of 2473 grams (1.2365 gram moles) of polypropylene glycol (P-2000) and 1 gram of stannous octoate was added with stirring to a mixture of 330 grams (1.897 g moles) of toluene diisocyanate (80/20 mixture of 2,4- and 2,6-isomers) and 0.465 grams of stannous octoate and stirring was continued until the reaction was complete (—OH IR absorption gone). 162.5 Grams (1.25 g moles) of 2-hydroxyethyl acrylate (and a small amount of methylethylhydroquinone vinyl stabilizer) was then stirred into the reaction mixture and allowed to react until the —OH IR absorption was minimized and the urethane carbonyl absorption maximized. A small amount of toluene diisocyanate was added to react out the last of the —OH and then the residual —NCO was reacted out by adding about 0.5–1.0 grams of isopropanol. The resulting product, a very viscous, clear light yellow-colored liquid, was then diluted with styrene to an 80 wt. % VRP content solution, designated herein as "VRP-A2".

A(3–6). Preparation of a series of type A VRP's using polyglycols of different molecular weights and/or composition.

Toluene diisocyanate (2.0 moles) and phenothiazine (0.05 percent) were added to a reactor and heated to 60° C. with stirring. The toluene diisocyanate used was an 80 to 20 weight percent mixture of the 2,4- and 2,6 isomers, respectively. Hydroxypropyl acrylate (2.0 moles) was mixed with stannous octoate catalyst (0.12 weight percent) and this mixture was added to the reactor over a 1.5 to 2.0 hour period. The reaction was allowed to progress at the 60° C. reaction temperature until infrared spectrophotometric analysis of a film sample of the reaction product demonstrated essentially complete reaction (disappearance of hydroxyl group), typically 2.0 to 3.0 hours. At that time, the polyglycol component was added in an amount to provide 1.0 mole of reactive hydroxyl groups. The polyglycol component was chosen from the following:

(3) polypropylene glycol of 1200 average molecular weight.
(4) polypropylene glycol of 2000 average molecular weight,
(5) polypropylene glycol of 4000 average molecular weight, or
(6) the 3000 average molecular weight adduct of glycerin and a 92.0 percent propylene oxide-8.0 percent ethylene oxide mixture.

The reaction was continued at the 60° C. temperature until infrared spectrophotometric analysis indicated essentially complete reaction (disappearance of the isocyanate and hydroxyl groups), typically 3.0 to 4.0 hours. The reactor was cooled and the vinyl reactive plasticizer recovered and designated as VRP-(A4), -(A5), etc.

NOTE: The 4000 molecular weight polyglycol included about 30 wt. % of a species having only one terminal hydroxy group, the other end group being

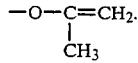

B. Preparation of VRP's from isocyanatoethyl methacrylate and a polyol.

(1) 80.4 grams (0.52 g mole) of isocyanatoethyl methacrylate, 519.6 grams (0.26 g mole) of P-2000, 0.66 grams of stannous octoate (catalyst) and 0.05 gram of phenothiazine (vinyl stabilizer) were stirred together in a round-bottomed flask for 3 hours. The reaction proceeded, to completion, spontaneously, i.e., without heating. The resultant VRP exhibited a low viscosity and had the statistical structure (B-1):

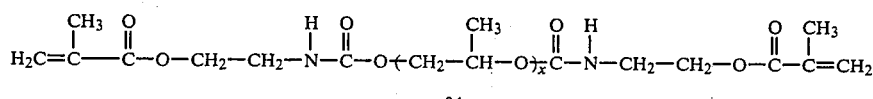

(2) A higher molecular weight VRP was made in two steps. 25.2 Grams (0.145 g mole) of toluene diisocyanate (Type I NACONATE 80) was added slowly to a solution of 0.69 gram of stannous octoate in 574.8 grams (0.2874 g mole) of P-2000. After stirring for several hours, the resulting glycol-extended diurethane was reacted with 44.5 grams (0.287 g mole) of isocyanatoethyl methacrylate as in (1) above. The resultant VRP was substantially more viscous than that obtained in preparation B-(1) and had the statistical structure (B-2):

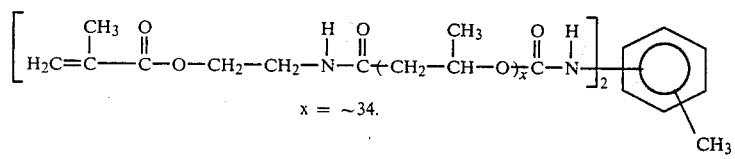

(3) Preparation of type (1) oligomer at elevated temperatures.

Isocyanatoethylmethacrylate (1.0 mole) was added to a reactor and heated to 70° C. with stirring. Polypropylene glycol of 2000 average molecular weight was mixed with stannous octoate catalyst (0.10 weight percent) and a sufficient amount was added to the reactor so as to provide 0.50 mole of reactive hydroxyl groups. The reaction was continued at the 70° C. temperature for 30 minutes. At this time, infrared spectrophotometric analysis indicated essentially complete reaction (disappearance of the isocyanate and hydroxyl groups). The reactor was cooled and the vinyl reactive plasticizer (VRP B3) recovered.

C. Preparation of a vinyl-terminated urethane oligomer ("VRP-C") comprising isopropenyl phenol-derived end groups.

Toluene diisocyanate (0.255 mole, 44.41 grams), p-isopropenyl phenol (0.255 mole, 34.21 grams), and phenothiazine (0.055 weight percent, 0.167 grams) were added to a glass reactor and maintained under a nitrogen atmosphere with stirring. The toluene diisocyanate was an 80 to 20 weight percent mixture of the 2,4- and 2,6-isomers, respectively. The p-isopropenyl phenol contained less than 1.6 weight percent dimer and only a trace of residual phenol. The reactants were heated to 45° C. A catalyst package consisting of an organo tin salt commercially available from Witco Chemical Co. as FOMREZ UL-28 (0.152 grams) and a tertiary amine commercially available from Abbot Labs as POLY-CAT DBU (0.152 grams) was added to the stirred slurry and air cooling of the reactor exterior was started. A maximum exotherm to 82° C. occurred four minutes later. Cooling reduced the temperature of the reactor contents to 60° C. and this temperature was maintained for 56 minutes. At this time, infrared spectrophotometric analysis of a film sample of the transparent, pale yellow-colored reaction product demonstrated that the reaction of the isocyanate with the phenolic hydroxyl was essentially complete (disappearance of hydroxyl group, appearance of carbonyl group). Polypropylene glycol (0.1275 mole, 225.0 grams) with an average molecular weight of 2000 was added to the reactor, followed by the addition of more catalyst, Witco FOMREZ UL-28 (0.076 grams) and POLYCAT DBU (0.152 grams). A maximum exotherm to 68° C. occurred eleven minutes later. Cooling reduced the reaction temperature to 65° C. and this reaction temperature was maintained for 3.8 hours. At this time, infrared spectrophotometric analysis of a film sample of the white-colored, viscous, liquid reaction product demonstrated that the reaction of the remaining isocyanate groups with the aliphatic hydroxyl groups was complete. The reactor contents were cooled and a vinyl-reactive "oligomer" (VRP-C) of the following statistical formula (C) was recovered:

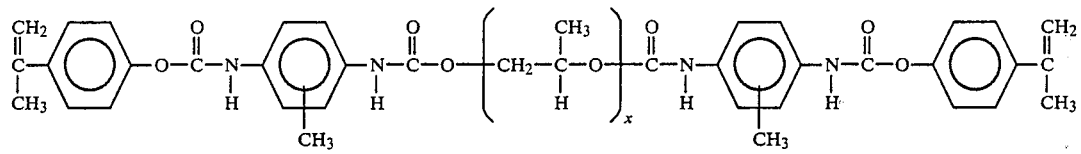

where x = ~34.

D. Preparation of a VRP comprising alkylene oxide-extended hydroxy-functional acrylate end groups.

Polypropylene glycol (0.06375 mole, 127.5 grams) with an average molecular weight of 2000 and containing dissolved stannous octoate (0.1105 gram) and an organo tin salt commercially available from Witco Chemical Co. as FOMREZ UL-28 (0.1105 gram) was added over a one-minute period to a glass reactor containing stirred toluene diisocyanate (0.1275 mole, 22.21 grams) under a nitrogen atmosphere. The toluene diisocyanate used was an 80 to 20 weight percent mixture of the 2,4- and 2,6-isomers, respectively. A maximum exotherm to 51° C. occurred three minutes later; then the reaction temperature was increased to 60° C. After 44 minutes at the 60° C. reaction temperature, infrared spectrophotometric analysis of a film sample of the transparent reaction product demonstrated that the reaction of the isocyanate with the aliphatic hydroxyl group was complete (disappearance of hydroxyl group, appearance of urethane carbonyl group). 51.19 Grams (0.1275 moles) of the mono(2-hydroxyethylacrylate)ether of pentapropylene glycol-1,2 was then added. The reaction temperature was maintained at 60° C. and after 78 minutes, infrared spectrophotometric analysis of a film sample of the transparent reaction product demonstrated that the reaction of the remaining isocyanate groups with the aliphatic hydroxyl groups was complete. Hydroquinone (100 ppm) was added to the reactor and the resulting VRP (designated herein as VRP-D) was recovered.

The oligomer (VRP-D) had the statistical structure (D):

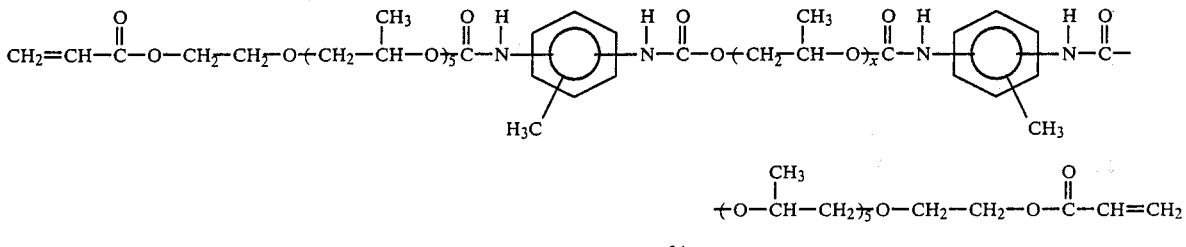

x = ~34.

II. Representative Alkyd Preparations (Not an example of the invention.)

1. An orthophthalic polyester was prepared as follows:

Maleic anhydride (323.60 grams, 3.30 moles) and phthalic anhydride (325.86 grams, 2.20 moles) were added to a reactor and heated to a white-colored stirred slurry maintained at 100° C. under a nitrogen atmosphere. Propylene glycol (460.41 grams, 6.05 moles) was added and a maximum exotherm of 140° C. resulted nineteen minutes later. At that time, nitrogen sparging was increased to 0.5 liter per minute, a steam condenser was started, and the temperature controller was set at 160° C. That temperature was achieved five minutes later. After two hours, the temperature controller was set at 205° C. and that temperature was achieved thirty-two minutes later. After 8.0 hours at the 205° C. reaction temperature, a total of 103 milliliters of water layer had accumulated in a Dean Stark trap. The reactor was cooled to 165° C. and 100 ppm of hydroquinone was added. The unsaturated polyester alkyd was recovered as a clear, transparent solid with a final acid number of 27.2. It was designated as alkyd 1.

III. Examples of the Invention

In each of the following examples, styrene/alkyd mixtures including and not including a VRP were prepared and compared as to physical and mechanical properties.

EXAMPLE 1

Portions of the foregoing alkyd (1) were mixed with styrene and VRP-A1 in the amounts given in the following tabulation.

| Formulation | Polyester Alkyd (grams/%) | Styrene (grams/%) | Vinyl Reactive Plasticizer (grams/%/pha[1]) |
|---|---|---|---|
| 1 | 199.5/57.0 | 136.5/39.0 | 14.0/4.0/7.0 |
| 2 | 199.5/57.0 | 126.0/36.0 | 24.5/7.0/12.3 |
| 3 | 199.5/57.0 | 150.5/43.0 | 0 |

Note:
[1] pha = parts VRP per hundred parts of alkyd.

The resin formulations (1-3) were used to determine SPI gel and cure characteristics (84° C.), Brookfield viscosity (25° C.), and a clear, unfilled 1/8" casting was made for heat distortion temperature, tensile and flexural strength, flexural modulus, percent elongation, and average Barcol hardness (934-1 scale) determinations. The clear casting was prepared using a cure system of 1.0% benzoyl peroxide and 0.01% N,N-dimethylaniline at room temperature, followed by post-curing for 2.0 hours at 100° C. Mechanical properties of tensile (6) and flexural (6) test pieces were determined using an Instron machine with standard test methods (ASTM D-638 and D-790). Heat distortion temperatures were determined using an Aminco Plastic Deflection Tester (American Instrument Company) with standard test methods (ASTM D-648). The results are reported in Table 1.

TABLE 1

| | Wt. % VRP-Al in Formulation | | |
|---|---|---|---|
| | 0.0 | 4.0 | 7.0 |
| Brookfield Viscosity (cp) | 239 | 566 | 1153 |
| SPI Gel Test | | | |
| Gel time (min) | 2.6 | 4.0 | 5.5 |
| Cure time (min) | 4.0 | 5.5 | 7.3 |
| Maximum exotherm (°C.) | 231 | 224 | 210 |
| Average Barcol Hardness | 48 | 42 | 35 |
| Heat Distortion Temperature (°F.) | 217 | 210 | 198 |
| Tensile Strength $\times 10^{-3}$ (psi) | 9.5 | 8.9 | 8.6 |
| Elongation (%) | 2.0 | 2.5 | 3.7 |
| Flexural Strength $\times 10^{-3}$ (psi) | 18.9 | 18.2 | 15.3 |
| Flexural Modulus $\times 10^{-5}$ (psi) | 6.3 | 5.5 | 4.6 |

It will be seen that each property responded in a regular manner to the amount of VRP present in the formulation. The increases in percent elongation resulting from inclusion of the VRP were noteworthy, whereas the decreases in heat distortion temperature, tensile strength and flexural strength were quite acceptable.

EXAMPLE 2

Effect of VRP-Al on Mixture of Styrene with an Isophthalate Polyester Alkyd

A portion of VRP-Al was mixed with one of two portions of a styrenated, commercial grade, unsaturated isophthalate alkyd prepared from isophthalic acid, maleic anhydride and propylene glycol. No VRP was added to the second portion. The properties of the two materials were compared in the manner of Example 1. The results are given in Table 2.

TABLE 2

| | Wt. % VRP-Al in Mixture | |
|---|---|---|
| | 7.5 | 0 |
| Brookfield Viscosity (cp) | 457 | 224 |
| SPI Gel Test | | |
| Gel time (min) | 5.7 | 4.1 |
| Cure time (min) | 9.2 | 6.1 |

TABLE 2-continued

| | Wt. % VRP-Al in Mixture | |
|---|---|---|
| | 7.5 | 0 |
| Maximum exotherm (°C.) | 186 | 215 |
| Average Barcol Hardness | 34 | 47 |
| Heat Distortion Temperature (°F.) | 198 | 208 |
| Tensile Strength $\times 10^{-3}$ (psi) | 8.2 | 9.7 |
| Elongation (%) | 5.6 | 2.1 |
| Flexural Strength $\times 10^{-3}$ (psi) | 15.4 | 21.7 |
| Flexural Modulus $\times 10^{-5}$ (psi) | 4.5 | 6.2 |

It will be seen that the increase in % elongation resulting from inclusion of about 7% VRP was dramatically greater and the decrease in heat distortion temperature dramatically less than for the orthophthalate alkyd of Example 1. This clearly demonstrates that effective flexibilization of one type of alkyd by vinyl-terminated urethane oligomers does not make it obvious that a different type of alkyd will be effectively flexibilized by the same oligomers.

EXAMPLE 3

Effect of VRP-Al on Mixture of Styrene with an Inherently More Brittle—But Also More Fire Resistant—Polyester Alkyd A portion of VRP-Al was mixed with one of two portions of a mixture of styrene with a commercial grade, unsaturated polyester alkyd prepared from chlorendic anhydride, maleic anhydride and propoxylated neopentyl glycol. The properties of the two materials were compared in the manner of Example 1. The results are given in Table 3.

TABLE 3

| | Wt. % VRP-Al in Mixture | |
|---|---|---|
| | 7.5 | 0 |
| Brookfield Viscosity (cp) | 417 | 228 |
| SPI Gel Test | | |
| Gel time (min) | 7.7 | 4.1 |
| Cure time (min) | 11.4 | 6.4 |
| Maximum exotherm (°C.) | 210 | 231 |
| Average Barcol Hardness | 45 | 49 |
| Heat Distortion Temperature (°F.) | 208 | 255 |
| Tensile Strength $\times 10^{-3}$ (psi) | 8.4 | 8.7 |
| Elongation (%) | 2.2 | 2.0 |
| Flexural Strength $\times 10^{-3}$ (psi) | 17.2 | 16.5 |
| Flexural Modulus $\times 10^{-5}$ (psi) | 5.4 | 6.2 |

It will be seen that about a 10% increase in % elongation was achieved at the expense of a substantial decrease in heat distortion temperature (HDT). However, the HDT of the unflexibilized resin was high enough to start with so that the HDT after flexibilization was still acceptable for practically all common applications of polyester resins.

EXAMPLE 4

Effects of VRP-Al on Impact Strengths of the Alkyd/styrene Mixtures of Examples 1-3

Ten $2\frac{1}{2} \times \frac{1}{2} \times \frac{1}{8}$ inch test pieces were prepared from castings of each of the formulations (mixtures) compared in Tables 1-3. Unnotched Izod impact strengths were determined from the test pieces by ASTM test method D-256, using a TMI Impact Tester No. 43-1. The results are given in Table 4.

TABLE 4

| Alkyd/styrene Mixture of | Wt. % VRP-A1 | Impact Strength (Ft. lbs./in.) |
|---|---|---|
| Example 1 | 0.0 | 2.3 |
|  | 4.0 | 2.3 |
|  | 7.0 | 2.6 |
| Example 2 | 0.0 | 2.9 |
|  | 7.5 | 6.2 |
| Example 3 | 0.0 | 2.5 |
|  | 7.5 | 1.7 |

It will be seen, again, that the favorable effect of the VRP (on impact strength) is dramatically greater for the isophthalate alkyd resin of Example 2 than for the orthophthalate alkyd resin of Example 1. The reason for the apparently unfavorable effect on the resin of Example 3 is not known.

EXAMPLE 5

Effects of 2.5, 5.0 and 7.5 Wt. Percents of VRP's A3-6 on Mechanical Properties of an Orthophthalic Molding Resin Portions of a styrenated, commercial grade, unsaturated orthophthalic polyester molding resin prepared by the reaction of phthalic anhydride (14.3 mole %), maleic anhydride (33.3 mole %) and propylene glycol (52.4 mole %) were formulated to contain 2.5, 5.0 and 7.5 wt. % of each of VRP's A3-6. An additional portion of the resin, containing no VRP, was taken for comparison. The mechanical properties of the cured mixtures were determined by the method of Example 1. The results are given in Table 5.

TABLE 5

| VRP | Wt. % VRP Tensile Strength $\times 10^{-3}$ (psi) | | | Wt. % VRP Elongation % | | | Wt. % VRP Flexural Strength $\times 10^{-3}$ (psi) | | | Wt. % VRP Flexural Modulus $\times 10^{-5}$ (psi) | | |
|---|---|---|---|---|---|---|---|---|---|---|---|---|
|  | 2.5 | 5.0 | 7.5 | 2.5 | 5.0 | 7.5 | 2.5 | 5.0 | 7.5 | 2.5 | 5.0 | 7.5 |
| A3 | 7.5 | 6.9 | 7.0 | 1.6 | 1.7 | 1.7 | 15.5 | 15.1 | 14.7 | 6.1 | 5.3 | 5.2 |
| A4 | 4.9 | 6.0 | 5.0 | 1.1 | 1.6 | 1.4 | 16.3 | 13.3 | 11.1 | 5.8 | 4.9 | 4.7 |
| A5 | 4.7 | 4.1 | 5.0 | 1.1 | 1.1 | 1.3 | 10.3 | 9.5 | 9.2 | 5.8 | 4.7 | 4.5 |
| A6 | 6.2 | 7.4 | 6.8 | 1.4 | 2.2 | 1.9 | 15.8 | 12.9 | 15.2 | 5.4 | 5.0 | 4.7 |
| None | 3.5 | | | 0.6 | | | 14.7 | | | 5.5 | | |

Each VRP a reaction product of hydroxypropylacrylate, toluene diisocyanate and a polyglycol as follows:
(A3) Polypropylene glycol of 1200 average mol. wt.
(A4) Polypropylene glycol of 2000 average mol. wt.
(A5) Polypropylene glycol of 4000 average mol. wt.
(A6) 3000 average mol. wt. adduct of 92.0% propylene oxide and 8.0% ethylene oxide mixture with glycerin.

It will be seen that a good balance of properties resulted at a content of about 5 wt. % of each VRP. However, dramatic improvements in tensile strength and percent elongation were obtained with all VRP's at all three wt. percents. The A3 formulations also had better flexural strengths at all wt. percents and the greatest decrease in flexural modulus ($4.7 \times 10^5$ at 7.5 wt. % A5, vs. $5.5 \times 10^5$ at 0 wt. %) was not intolerable.

EXAMPLE 6

A portion of the styrenated commercial grade unsaturated orthophthalic polyester molding resin of Example 5 and the vinyl reactive plasticizer A6 were formulated to provide a 95.0, 5.0% solution, respectively. This solution was used to prepare a 0.0625 inch (0.15875 cm) clear, unfilled casting and cured using the method of Example 1. A test piece was prepared from the clear, unfilled casting to have the following measurements: 6.5 inches (16.51 cm) length, 0.625 inch (1.5875 cm) width at tab ends, routed to a 0.400 inch (1.016 cm) width at center. An otherwise identical test piece was prepared from another portion of the molding resin to which no VRP had been added. The test pieces were used for plane strain compression testing with applied tension using the methods of P. B. Bowden and J. A. Jukes reported in Journal of Material Science 3, 182 (1968) and 7, 52 (1972). Sample cross-sectional area was 0.025 square inch (0.16129 cm²) and tensile load was increased by 564 psi (3889 kPa) increments. The creep rate taken as yield was approximately 0.002 inch per minute (0.3048 cm/sec). Tension (psi) versus compression (psi) yield point values thus obtained were plotted. Tensile and compressive yield strength values were determined by extrapolation of the plotted biaxial yield line. Ductility was calculated as the ratio of tension at break to the tensile yield strength. The results are reported in Table 6.

TABLE 6

|  | Wt % VRP A6 | |
|---|---|---|
|  | 5 | 0 |
| Ductility | 0.51 | less than 0.01 |
| Tension at Break, psi | 5,556 | * |
| Compression at Break, psi | 7,781 | * |
| Tensile Yield Strength, psi | 11,000 | * |
| Compressive Yield Strength, psi | 15,365 | * |

*Sample breaks at all test points.

EXAMPLE 7

Effect of 5 Wt. % of VRP B3 on Mechanical Properties of Molding Resin Used in Example 5

Portions of the molding resin containing 0 and 5 wt. percents of VRP B3 (derived from isocyanatoethyl methacrylate and polyglycol P2000) were cured and their physical properties determined as in Example 1. The results are given in Table 7.

TABLE 7

|  | Wt. % VRP B3 | |
|---|---|---|
|  | 5 | 0 |
| Brookfield Viscosity (cp) | 739 | 720 |
| Heat Distortion Temperature (°F.) | 225 | 232 |
| Tensile Strength $\times 10^{-3}$ (psi) | 7.4 | 3.5 |
| Elongation (%) | 2.1 | 0.6 |
| Flexural Strength $\times 10^{-3}$ (psi) | 14.6 | 14.7 |
| Flexural Modulus $\times 10^{-5}$ (psi) | 5.0 | 5.5 |

It will be seen that excellent flexibilization was achieved at the expense of quite minor decreases in HDT and flexural properties.

EXAMPLE 8

Effect of 7.5 Wt. % of VRP-D on Physical and Mechanical Properties of Isophthalic Resin Used in Example 2

Portions of the styrenated isophthalic polyester were formulated to contain 0 and 7.5 wt. percents of VRP-D. The physical and mechanical properties of the two materials given in Table 8 were determined as in Example 1 and the Plane Strain data given in Table 9 were determined as in Example 6, except that ductility was calculated as one minus the ratio of compression at break to the compresive yield strength.

TABLE 8

|  | Wt. % VRP-D[1] | |
| --- | --- | --- |
|  | 7.5% | 0%[2] |
| Brookfield Viscosity (cp) | 449 | 224 |
| SPI Gel Test | | |
| Gel time (min) | 6.5 | 4.1 |
| Cure time (min) | 10.5 | 6.1 |
| Maximum exotherm (°C.) | 183 | 215 |
| Average Barcol Hardness | 25 | 47 |
| Heat Distortion Temperature (°F.) | 181 | 208 |
| Tensile Strength × $10^{-3}$ (psi) | 7.2 | 9.7 |
| Elongation (%) | 3.8 | 2.1 |
| Flexural Strength × $10^{-3}$ (psi) | 14.5 | 21.7 |
| Flexural Modulus × $10^{-5}$ (psi) | 4.3 | 6.2 |

Notes:
[1] Derived from P-2000, TDI and mono(2-hydroxy-ethylacrylate)ether of pentapropylene glycol 1,2.
[2] From Table 2, Example 2.

TABLE 9

|  | Wt. % VRP D | |
| --- | --- | --- |
|  | 7.5 | 0 |
| Ductility | 0.76 | 0.49 |
| Tension at Break, psi | 7,506 | 7,030 |
| Compression at Break, psi | 3,432 | 10,523 |
| Tensile Yield Strength, psi | 9,850 | 14,500 |
| Compressive Yield Strength, psi | 14,281 | 20,500 |

The Izod Impact Strength (unnotched) of the cured 7.5% VRP-D formulation was 4.5 ft. lbs./inch, as compared to 2.9 for an otherwise identical portion of the styrenated isophthalate resin containing no VRP (same as given for "Example 2" in Table 4).

It will be seen that the VRP effectively flexibilized the isophthalate alkyd/styrene mixture without reducing the HDT to an intolerable extent.

What is claimed is:

1. A flexibilizer/alkyd composition which does not phase separate upon curing and consists essentially of
   a. an unsaturated polyester and/or polyesteramide alkyd which includes no terminal polycycloalkenyl groups, and
   b. a total of from about 1 to about 20 parts by weight of a flexibilizer consisting essentially of one or more urethane oligomers per hundred parts of said alkyd, said oligomers each having at least one vinyl-reactive end group and being an addition product of a polyether glycol with an unsaturated isocyanate or with a diisocyanate and an unsaturated compound comprising an —NCO or —CH$_2$OH group,
   c. from 0 to about 400 parts by weight of a non-resinous vinyl monomer per hundred parts of said alkyd, with the proviso that, when said alkyd comprises an unsaturated polyester, either the parts by weight of said oligomers per hundred parts of said alkyd is not in excess of $11+9a/(a+e)$, where a and e are the parts by weight, respectively, of said polyesteramide and said polyester in said composition, or said unsaturated compound is an unsaturated isocyanate, an alkenylphenol, a hydroxyalkylacrylate-initiated polyglycol or N-methylolacrylamide.

2. The composition of claim 1 in which the content of said non-resinous vinyl monomer is from about 50 to about 80 parts by weight per hundred parts of said alkyd.

3. The composition of claim 2 in which said monomer is styrene.

4. The composition of claim 3 in which said styrene is present in the amount of from about 60 to about 70 parts by weight per hundred parts of said alkyd.

5. The composition of claim 4 in which the amount of said oligomer present therein is from about 1 to about 10 wt. percent.

6. The composition of claim 5 in which the amount of said oligomer present therein is from about 4 to about 8 wt. percent.

7. The composition of claim 2 in which said flexibilizer consists essentially of an addition product of said polyether glycol with isocyanatoethylmethacrylate alone or together with a diisocyanate.

8. The composition of claim 2 in which said flexibilizer consists essentially of an addition product of said polyether glycol with a diisocyanate and a hydroxyalkylacrylate-initiated polyglycol.

9. The composition of claim 2 in which said flexibilizer consists essentially of an addition product of said polyether glycol with a diisocyanate and p-isopropenylphenol.

10. The composition of claim 2 in which said flexibilizer consists essentially of an addition product of said polyether glycol with a diisocyanate and N-methylol acrylamide.

11. The composition of claim 1 in which said alkyd consists of said unsaturated polyesteramide and said unsaturated compound is a hydroxyalkylacrylate, an unsaturated isocyanate, an alkenylphenol, a hydroxyalkylacrylate-initiated polyglycol or N-methylolacrylamide.

12. The composition of claim 11 in which said non-resinous vinyl monomer is present in an amount of from 50 to about 80 parts by weight per hundred parts of said alkyd.

13. The composition of claim 12 in which said unsaturated compound is a hydroxyalkylacrylate.

14. The composition of claim 4 in which said polyether glycol is a polypropylene glycol having a molecular weight of from about 2000 to about 3000.

15. The composition of claim 14 in which said diisocyanate is tolylene diisocyanate.

16. The composition of claim 1 in which said alkyd is an unsaturated isophthalic polyester.

17. The composition of claim 16 in which:
said flexibilizer consists essentially of an addition product of said polyether glycol with a diisocyanate and a hydroxyalkylacrylate-initiated polyglycol, an unsaturated isocyanate p-isoproponyl phenol or N-methylolacrylamide;
said vinyl monomer is styrene and is present in the amount of from about 60 to about 70 parts by weight per hundred parts of said alkyd.

18. The composition of claim 17 in which said flexibilizer constitutes from about 5 to about 7.5 weight percent of the composition.

19. The composition of claim 17 in which said oligomer has the statistical structure

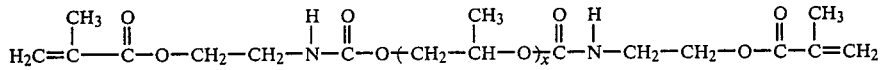

x = ~34.

20. The composition of claim 16 in which said polyether glycol is a polypropylene glycol having a molecular weight of from about 2000 to about 3000.

21. The composition of claim 20 in which said diisocyanate is tolylene diisocyanate.

22. The composition of claim 1 in which said flexibilizer consists essentially of an addition product of said polyether glycol with an unsaturated isocyanate.

23. The composition of claim 22 in which said unsaturated isocyanate is isocyanatoethylmethacrylate.

24. The composition of claim 1 in which said polyether glycol is a polypropylene glycol having a molecular weight of from about 2000 to about 3000.

25. The composition of claim 24 in which said diisocyanate is tolylene diisocyanate.

26. The composition of claim 25 in which said oligomer has been made by reacting the polypropylene glycol with the tolylene diisocyanate and then reacting the resulting product with 2-hydroxypropyl acrylate.

27. The composition of claim 26 in which said oligomer has the statistical structure b. from about 1 to about 20 parts by weight of a flexibilizer, which consists essentially of one or more urethane oligomers, per hundred parts of said alkyd, said oligomers each having at least one vinyl-reactive end group and being an addition product of a polyether glycol with an unsaturated isocyanate or with a diisocyanate and an unsaturated compound comprising an —NCO or —CH$_2$OH group, and c. from 0 to about 400 parts by weight of a non-resinous vinyl monomer per hundred parts of said alkyd, with the proviso that, when said alkyd comprises an unsaturated polyester, either the parts by weight of said oligomers per hundred parts of said alkyd is not in excess of $11 + 9a/(a+e)$, where a and e are the parts by weight, respectively, of said polyesteramide and said polyester in said composition, or said unsaturated compound is an unsaturated isocyanate, an alkenylphenol, a hydroxyalkylacrylate-initiated polyglycol or N-methylolacrylamide.

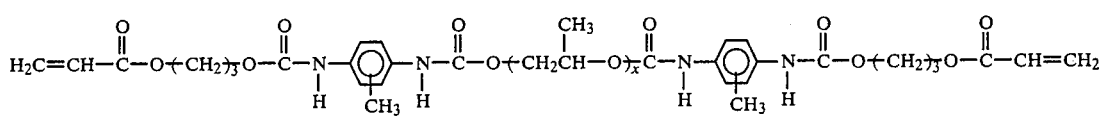

x = ~34

28. The composition of claim 25 in which said oligomer has been made by reacting the tolylene diisocyanate with 2-hydroxyethyl acrylate and then reacting the resultant product with the polypropylene glycol.

29. The composition of claim 28 in which the polypropylene glycol has a molecular weight of about 2000.

30. The composition of claim 26 in which the polypropylene glycol has a molecular weight of about 2000.

31. The method of making a flexibilized alkyd resin, which does not phase separate upon curing, by mixing together a. an alkyd consisting essentially of an unsaturated polyester and/or polyesteramide which includes no terminal polycycloalkenyl groups, and 32. The method of claim 31 in which the amount of said non-resinous vinyl monomer mixed with said alkyd and/or oligomer(s) is from about 50 to about 80 parts by weight per 100 parts of the alkyd.

33. The method of claim 32 in which said alkyd is an isophthalic polyester and said monomer is styrene.

34. The method of claim 32 additionally comprising curing the resultant mixture.

35. The cured product made by the method of claim 34.

36. The method of claim 31 in which said polyglycol moiety is derived from a triol and the number of end groups in said oligomer is 3.

* * * * *

UNITED STATES PATENT AND TRADEMARK OFFICE
CERTIFICATE OF CORRECTION

PATENT NO. : 4,524,178

DATED : June 18, 1985

INVENTOR(S) : Robert E. Hefner, Jr.; Patrick H. Martin; Gregory A. Stevens

It is certified that error appears in the above—identified patent and that said Letters Patent is hereby corrected as shown below:

Cover page, Foreign Patent Documents, the Fed. Rep. of Germany, classes "523/208" should be -- 523/508 --.

Column 16, line 9, please delete "182" and insert -- 183 --.

Signed and Sealed this

Fourteenth Day of January 1986

[SEAL]

Attest:

Attesting Officer

DONALD J. QUIGG

Commissioner of Patents and Trademarks